US 6,717,417 B2

(12) United States Patent
Jungbauer et al.

(10) Patent No.: US 6,717,417 B2
(45) Date of Patent: Apr. 6, 2004

(54) ELECTRONIC CONTROLLER FOR A MOTOR VEHICLE AUTOMATIC TRANSMISSION AND METHOD FOR CALIBRATING A POSITION DETECTION SENSOR IN AN ELECTRONIC CONTROLLER FOR A MOTOR VEHICLE AUTOMATIC TRANSMISSION

(75) Inventors: Bernd Jungbauer, Regensburg (DE); Dieter Krause, Regensburg (DE); Josef Loibl, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/074,821

(22) Filed: Feb. 12, 2002

(65) Prior Publication Data

US 2002/0089336 A1 Jul. 11, 2002

Related U.S. Application Data

(63) Continuation of application No. PCT/DE00/02646, filed on Aug. 8, 2000.

(30) Foreign Application Priority Data

Aug. 12, 1999 (DE) .......................... 199 38 110

(51) Int. Cl.[7] .......................... G01R 35/00; G01B 7/14; G06F 17/00
(52) U.S. Cl. ..................... 324/601; 324/207.13; 701/51
(58) Field of Search ............... 324/601, 207.13, 324/207.23, 202; 73/1.79; 702/94; 701/51, 55, 56; 477/34; 74/335, 495; 475/131

(56) References Cited

U.S. PATENT DOCUMENTS

| 4,041,371 | A | * | 8/1977 | Hini ........................... 323/368 |
| 4,698,996 | A | * | 10/1987 | Kreft et al. .................. 73/1.79 |
| 5,621,317 | A | * | 4/1997 | Wozniak ................ 324/207.13 |
| 6,253,138 | B1 | * | 6/2001 | Shober et al. ................. 701/51 |
| 2002/0156562 | A1 | * | 10/2002 | Berger et al. ................. 701/55 |

FOREIGN PATENT DOCUMENTS

| DE | 38 36 145 A1 | 4/1990 |
| DE | 43 40 917 C2 | 6/1995 |
| DE | 43 40 917 A1 | 6/1995 |
| DE | 44 25 904 A1 | 1/1996 |
| DE | 196 03 197 C1 | 2/1997 |
| DE | 197 45 537 A1 | 4/1999 |
| EP | 1 046 839 A2 | 10/2000 |

OTHER PUBLICATIONS

Erb, O. et al.: "PLCD, A Novel Magnetic Displacement Sensor", Elsevier Sequoia, 1991, pp. 277–282.

* cited by examiner

*Primary Examiner*—Anjan K. Deb
(74) *Attorney, Agent, or Firm*—Laurence A. Greenberg; Werner H. Stemer; Gregory L. Mayback

(57) ABSTRACT

An electronic controller for a motor vehicle automatic transmission and method for calibrating a position detection sensor in an electronic controller for a motor vehicle automatic transmission includes a controller having a position detection sensor supplying an analog output signal dependent upon the position of a selector slide. During the fabrication of a vehicle or after a replacement part is installed, the position detection sensor is statically calibrated in the electronic control system using a calibration program.

4 Claims, 3 Drawing Sheets

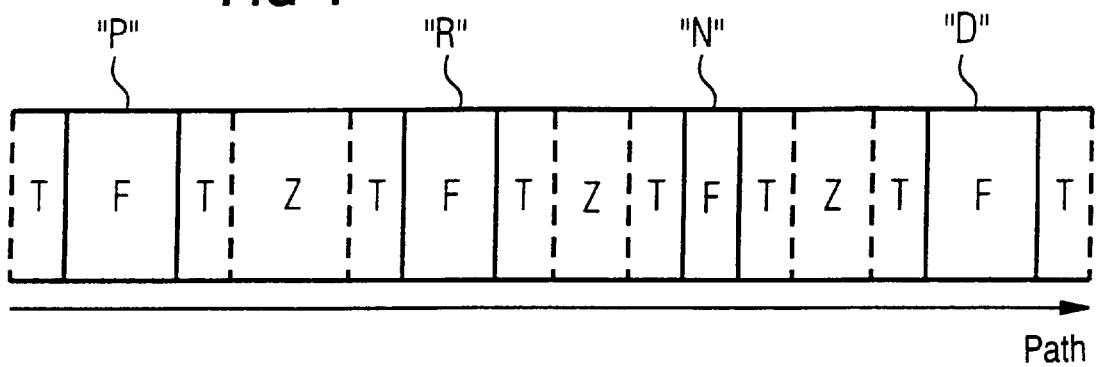
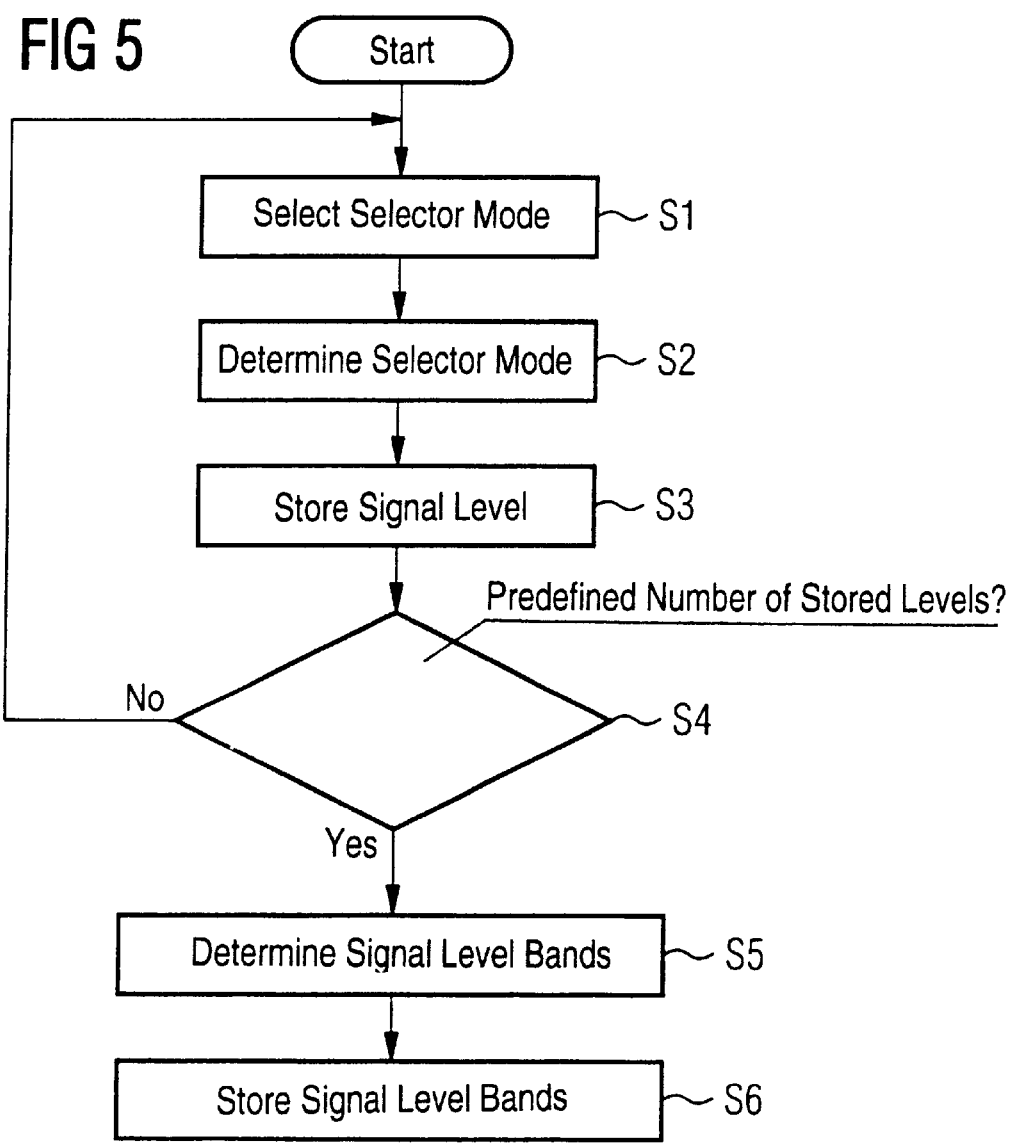

ELECTRONIC CONTROLLER FOR A MOTOR VEHICLE AUTOMATIC TRANSMISSION AND METHOD FOR CALIBRATING A POSITION DETECTION SENSOR IN AN ELECTRONIC CONTROLLER FOR A MOTOR VEHICLE AUTOMATIC TRANSMISSION

CROSS-REFERENCE TO RELATED APPLICATION

This application is a continuation of copending International Application PCT/DE00/02646, filed Aug. 8, 2000, which designated the United States.

BACKGROUND OF THE INVENTION

FIELD OF THE INVENTION

The invention relates to an electronic controller for a motor vehicle automatic transmission and a method for calibrating a position detection sensor in an electronic controller for a motor vehicle automatic transmission.

Automatic transmissions for passenger vehicles are usually controlled electronically. The controllers for such transmissions have previously been provided as what are referred to as stand-alone units in a control box protecting against ambient influences or have been directly installed in the passenger compartment of the vehicle. Recently, there has been a change over to integrating the electronic control system and the associated sensor systems directly into the automatic transmission for reasons of costs and quality. Fundamental system requirements for the operation of the electronics in the transmission include having operational capability over a wide temperature range, for example, −40° C. to 140° C., being leak proof with respect to transmission ATF oil, and having sufficient immunity to vibration, for example, 30 g. An optimized configuration with respect to temperature is achieved by bonding the electronic circuit on the ceramic substrate onto a metal base plate, for example, made of aluminum, using a thermally conductive adhesive.

In addition to rotational speed sensors, pressure sensors, and temperature sensors, customary transmission controllers for automatic transmissions have a position detection sensor that is used to sense which driving mode of the automatic transmission is set. The sensing is carried out, for example, by setting what is referred to as the selector mode switch into one of the positions "P" (Park), "R" (Reverse), "N" (Neutral), or "D" (Drive). The selector mode switch—also referred to below as selector lever—is mechanically connected to the automatic transmission in that it activates a selector slide that can move in a linear or rotary fashion. The selector slide is integrated into the hydraulic part of the transmission controller. The electronic controller is informed of the driving position that has been set by the sensing of the selector slide position using the position detection sensor.

For position detection, the prior art includes providing an independent sensor that is packed in an oil-tight fashion in a housing to protect against the ambient medium, namely transmission oil. The electrical connection of the sensor through corresponding lines to the controller must also be configured in an oil-tight fashion.

Various measuring principles are conceivable for the configuration of the sensors. German Patent DE 196 03 197 C1, corresponding to U.S. Pat. No. 5,969,519 to Steiling et al., discloses the use of magnetic field sensors that are based on the Hall effect. In such configurations, measurement quality is influenced to a considerable extent by the air gap between the magnet and sensor element. For this reason, a triggering element (PES slide) that is embodied as a slide and in which an encoded magnetic plate or a signal-transmitting magnet is integrated is guided with precise tolerances in guide grooves of the sensor housing. The transmission-internal selector slide engages in the PES slide and is rigidly connected to the selector lever in the interior of the vehicle through a linkage or a bowden cable. If the selector lever is moved from one position into another, the movable PES slide is also adjusted by the selector slide in the transmission so that the electronic transmission system can read in the new selector lever position.

Position detection sensors that are based on the Hall effect are embodied in an exclusively digital fashion, as are position detection sensors that are based electromechanically on the switch or slider principle. The absolute precision of the system results from a chain of tolerances of the electronic and mechanical components involved. A static correction after installation in the vehicle is no longer possible.

The post-published European laid-open application European Patent Application EP 1 046 839 A2 discloses an electronic controller for a motor vehicle automatic transmission with a position detection sensor. The sensor supplies an analog output signal as a function of the position of a selector slide and can be calibrated, even during operation, by an algorithm that is stored in the electronic control system.

The publication German Published, Non-Prosecuted Patent Application DE 43 40 917 A1 also discloses an electronic controller for a motor vehicle automatic transmission with a position detection sensor. Here, too, the sensor supplies an analog output signal as a function of the position of a selector slide. A calibration program that is stored in the electronic control can calibrate the system position detection sensor.

SUMMARY OF THE INVENTION

It is accordingly an object of the invention to provide a electronic controller for a motor vehicle automatic transmission and method for calibrating a position detection sensor in an electronic controller for a motor vehicle automatic transmission that overcomes the hereinafore-mentioned disadvantages of the heretofore-known devices and methods of this general type and that integrates a position detection sensor into an electronic controller in a simple and cost-effective way and with sufficient precision, and that permits the sensor to be calibrated after installation in the vehicle, the calibration status—calibrated or uncalibrated—of the position detection sensor being able to be established quickly and with little outlay.

With the foregoing and other objects in view, there is provided, in accordance with the invention, an electronic controller for a motor vehicle automatic transmission, including a housing, a selector slide moveable into a plurality of positions, a position detection sensor for sensing a position of the selector slide, and an electronic control system for controlling the automatic transmission. The position detection sensor is disposed in the housing, supplies an analog output signal dependent upon a position of the selector slide, and has a calibration status. The electronic control system is disposed in the housing, is electrically connected to the position detection sensor, and is programmed to calibrate the position detection sensor and identify the calibration status.

In addition to digital sensors (Hall sensors) analog sensor principles, for example, based upon a permanent magnetic linear contactless displacement sensor ("PLCD") are in the prior art for position detection sensors. A PLCD is based on a coil configuration, which contains an integrated electronic evaluation circuit, for example, as an ASIC module, and generates an analog output signal, preferably a voltage signal, based upon the position of signal-transmitting magnets relative to the sensor.

In position detection sensors, the precision with which the selector modes (P, R, N, and D) can be sensed is a decisive quality feature. In contrast to digital position detection sensors, with analog position detection sensors it is possible to compensate the sensor statically to largely eliminate fabrication and installation tolerances of the position detection sensor in the transmission and in the vehicle, and, thus, increase the precision in the system.

In accordance with another feature of the invention, there is provided a signal-transmitting magnet disposed directly on the selector slide.

In accordance with a further feature of the invention, the position detection sensor has an output, and the output is a redundant differential interface supplying the analog output signal and a complementary signal.

In accordance with an added feature of the invention, the position detection sensor is a permanent magnetic linear contactless displacement sensor.

In accordance with an additional feature of the invention, the selector slide is adjacent the housing.

In accordance with yet another feature of the invention, the housing is substantially oil tight.

In accordance with yet a further feature of the invention, the electronic control system is programmed to represent the calibration status with a status identifier.

With the objects of the invention in view, there is also provided a method for calibrating a position detection sensor in an electronic controller for a motor vehicle automatic transmission, including the steps of selecting one of a plurality of selector modes of a selector slide, determining which one of the selector modes the selector slide is in, supplying an analog output signal from the position detection sensor as a function of a position of the selector slide, determining a signal level of the analog output signal and storing the signal level in a non-volatile memory of an electronic control system, repeating the above steps until a predetermined number of signal levels is stored for at least two of the selector modes, determining signal level bands for respective ones of the at least two selector modes based upon the stored signal levels and storing the signal level bands in the non-volatile memory, calculating signal level bands for other ones of the selector modes based upon the stored signal levels and also storing the calculated signal level bands in the non-volatile memory, and resetting a status identifier in the electronic control system if signal level bands are stored in the non-volatile memory for all of the selector modes.

In accordance with yet an added mode of the invention, in the electronic control system, a calibration status of the position detection sensor is represented with a status identifier.

With the objects of the invention in view, there is also provided a method for calibrating a position detection sensor in an electronic controller for a motor vehicle automatic transmission including the steps of providing a selector slide having a plurality of selector modes and positions, supplying an analog output signal from the position detection sensor as a function of a position of the selector slide, determining a predefined number of signal levels of the analog output signal for at least two of the selector modes and storing the signal levels in a non-volatile memory of an electronic control system, determining signal level bands for respective ones of the at least two selector modes based upon the stored signal levels and storing the signal level bands in the non-volatile memory, and calculating signal level bands for other ones of the selector modes based upon the stored signal levels and also storing the calculated signal level bands in the nonvolatile memory.

In accordance with a concomitant feature of the invention, a status identifier is reset in the electronic control system if signal level bands are stored in the non-volatile memory for all of the selector modes.

Other features that are considered as characteristic for the invention are set forth in the appended claims.

Although the invention is illustrated and described herein as embodied in a electronic controller for a motor vehicle automatic transmission and method for calibrating a position detection sensor in an electronic controller for a motor vehicle automatic transmission, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

FIG. 4 is a schematic representation of a path of the selector modes of the position detection sensor according to the invention; and FIG. 5 is a flow chart of the method according to the invention for calibrating the position detection sensor.

DESCRIPTION OF THE PREFERRED EMBODIMENTS

Figure 1:
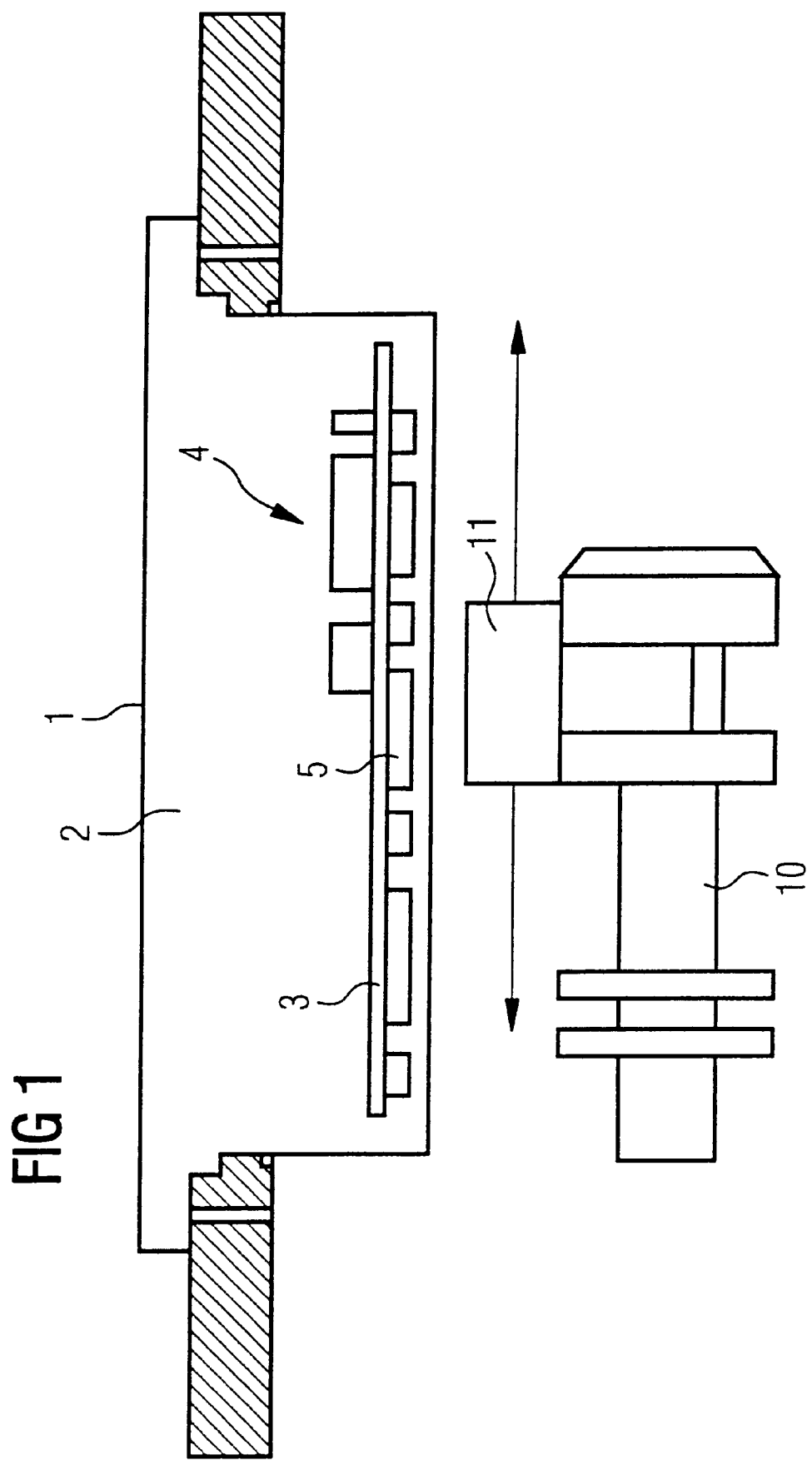
FIG. 1 is a cross-sectional view of a controller with position-sensor according to the invention.

Referring now to the figures of the drawings in detail and first, particularly to FIG. 1 thereof, there is shown an electronic controller for an automatic transmission of a motor vehicle with a housing 1. The interior 2 of the housing 1 is hermetically sealed against the ingress of fluid, that is to say, in particular, is oil tight. A circuit carrier 3, for example, a printed circuit board or a flex conductor foil with an electronic control system 4 (illustrated schematically by block components) is accommodated in the interior 2. A position detection sensor 5, which is embodied as a PLCD and also has, if appropriate, an electronic drive and evaluation system is also disposed in the interior 2 of the housing 1. The position detection sensor 5 is advantageously disposed directly on the circuit carrier 3 of the electronic control system 4.

Using the position detection sensor 5, it is possible to detect the position of a selector slide 10, which is rigidly connected to a non-illustrated selector lever in the interior of the vehicle through a linkage or a Bowden cable, and to communicate it to the electronic control system 4. When inductive sensors, for example, a PLCD, are used, the air gap between the signal-transmitting element and sensor element is significantly less critical than in prior art Hall sensors. A signal-transmitting magnet 11 can, therefore, be mounted directly on the selector slide 10. Guiding with precise tolerances in an additional PES slide is not absolutely necessary.

Figure 2:
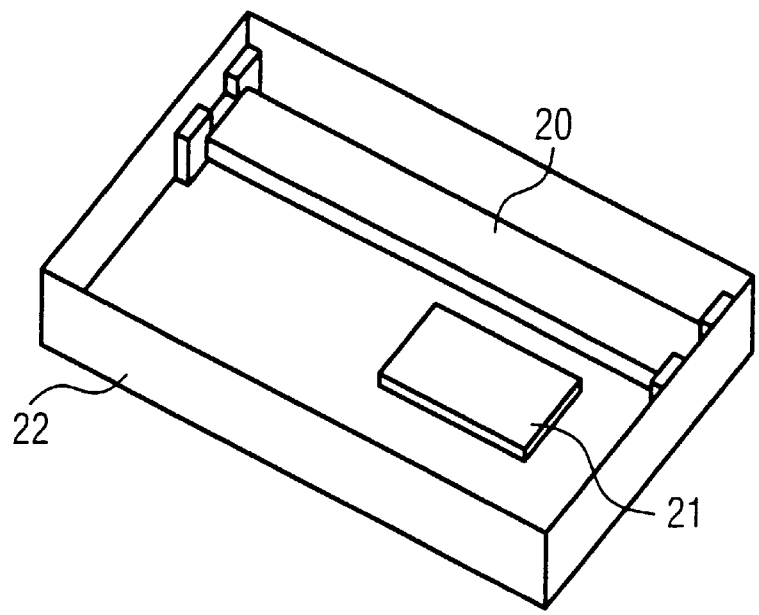
FIG. 2 is a perspective view of the position detection sensor of FIG. 1 with PLCD sensor elements.

According to the invention, an analog sensor principle, for example, based upon a PLCD, is used to detect the position of the selector slide 10. Such a sensor is based on a coil configuration 20 that is accommodated together with an integrated electronic evaluation circuit 21, for example, in the form of an ASIC module, in a sensor housing 22. See FIG. 2.

Figure 3:
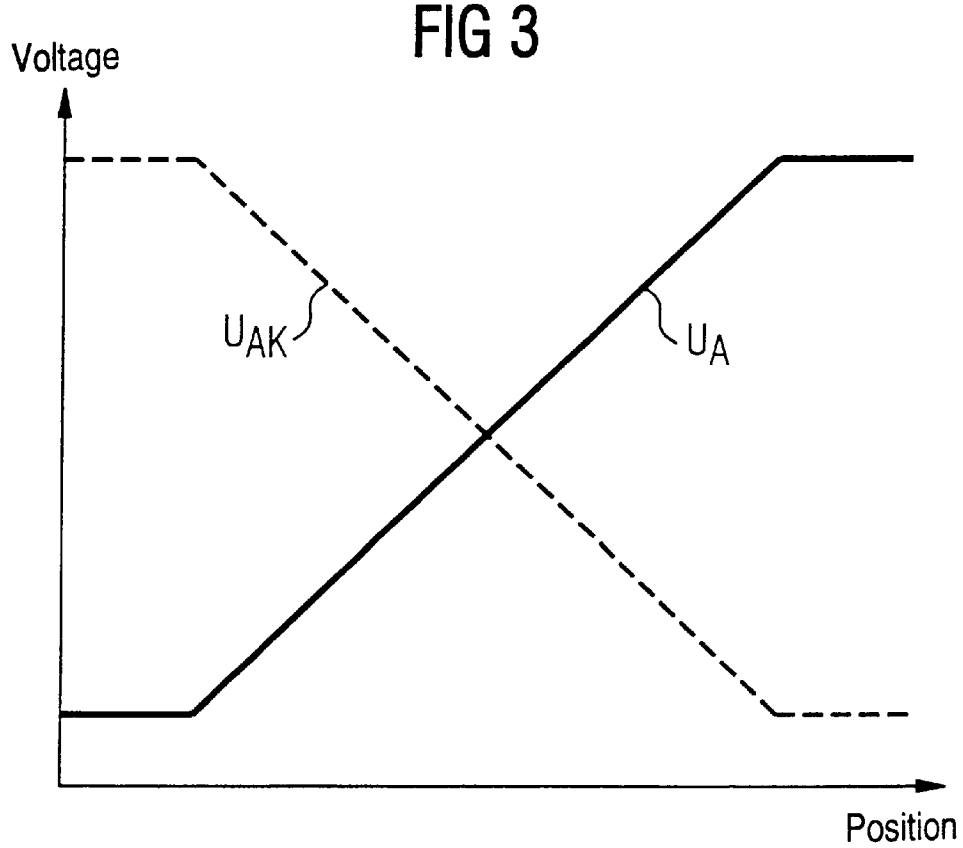
FIG. 3 is a graph illustrating the output signal of the PLCD sensor element according to the invention.

FIG. 3 illustrates a possible output signal of the PLCD as a function of the position of the selector slide 10. Here, the output of the sensor element may, for safety reasons, be embodied as a redundant differential interface. As a result, a complementary signal $U_{AK}$ is obtained in addition to an output voltage signal $U_A$. By comparing the output voltage signal $U_A$ with the complementary signal $U_{AK}$, malfunctions of the PLCD can be detected. The linear voltage signal can also be converted into discrete output values within the PLCD by an A/D converter integrated into the PLCD module. The output of the sensor element is then embodied as a serial interface or bus interface.

Linearly disposed switching points are predefined by the selector slide 10 with the signal-transmitting magnet 11. It is possible here to distinguish between driving positions F, intermediate positions Z and tolerance ranges T. See FIG. 4. Because the position detection sensor in the transmission of a motor vehicle constitutes a component that is critical for safety, a high degree of reliability and operational safety of the position detection sensor must be ensured. Driving positions F and intermediate positions Z of the selector slide must be detected unambiguously. In contrast to digital position detection sensors, for example, using Hall elements, in the case of analog position detection sensors, to ensure the desired precision of the system, it is possible to calibrate the sensor statically during the production of the vehicle, in particular, during the fabrication of the transmission or when replacement parts are installed in workshops.

To be able to detect the calibration status—calibrated or uncalibrated—of the position detection sensor 5 quickly and with little effort, a status identifier, for example, in the form of a software bit, is provided in the electronic control system 4 and is stored in a non-volatile memory of the electronic control system 4. As long as the position detection sensor 5 is not calibrated, the bit is set, for example, to the logic value one. In such a case, the transmission controller is placed in an emergency running mode that is indicated to the driver or operator through, for example, a warning lamp in the interior of the vehicle. The software bit is reset, for example, to the logic value zero, and the transmission controller placed in the normal operating mode, only when the position detection sensor has been calibrated and, thus, a reliable method of operation and a reliable driving mode are ensured.

For the calibration of the position detection sensor 5, a calibration program is stored in the electronic control system 4. The program is initiated, for example, by a starting signal through a serial interface of the position detection sensor 5. To ensure maximum precision during the calibration, each of the switched positions that are present, and, thus, each of the associated selector modes P, R, N, and D, must be selected repeatedly, preferably, two to five times. The adjustment of the selector lever that is necessary for the repetition is usually carried out manually by the operator, but can also be carried out in an automated fashion, for example, by a robot. If a selector mode has been selected using the selector lever (step S1), in a step S2 it is determined which of the selector modes the selector slide is in at that given moment. For such a purpose, for example, the resulting output voltage of the position detection sensor 5 is compared with respective lower and upper voltage limiting values of the individual selector modes P, R, N, and D. These limiting values can be stored in a standard fashion here in the non-volatile memory of the electronic control system 4. If the signal level of the output voltage of the position detection sensor 5 is constant over a predefined time period, the corresponding signal level is stored in a volatile memory of the electronic control system 4 in a step S3. The steps S1, S2, and S3 are then repeated until the predefined number, for example, 2 to 5, of stored signal levels is present in the non-volatile memory of the electronic control system (step S4) for each of the selector modes P, R, N, and D. The selector lever is advantageously moved in succession into each of the switched positions present, and the procedure is repeated for each selector mode in accordance with the required number of stored signal levels. Each individual switched position is maintained until the signal level that is obtained is present for a predefined time period and can be stored in the nonvolatile memory of the electronic control system 4.

If the predefined number of signal levels has been stored in the volatile memory of the electronic control system 4 for each selector mode, in step S5, signal level bands for the respective selector modes are determined based upon the stored values. For such a purpose, for example, the mean value can be formed from the signal levels stored for the respective selector mode and a predefined tolerance range can be set around the mean value. It is also conceivable to use the respective minimum and maximum values of the signal levels as extreme values for the signal level bands. The signal level bands that are determined are then stored in the non-volatile memory of the electronic control system 4 in step S6. As such, the calibration procedure is terminated, the status identifier is reset, and the transmission controller is placed in the normal functional status.

An analogous method can also be used if, for example, the output of the position detection sensor 5 is embodied as a serial interface or bus interface and discrete output values are transmitted to the electronic control system 4.

The method that is described with reference to FIG. 5 for calibrating the position detection sensor 5 is to be seen as merely exemplary. The decisive factor for the quality of the calibration is that the signal level bands for the individual selector modes are determined based upon a predefined number of corresponding signal levels of the output signal of the position detection sensor 5. The sequence of the sensing of the signal levels with respect to the selector modes is insignificant here. It is also conceivable for the signal level bands for the individual selector modes to be determined and stored independently of one another. That is to say, the signal level band for a selector mode is determined and stored as soon as the requested number of signal levels for the specific selector mode has been stored. However, it is to be noted that the status identifier is reset only if the signal level bands for all the selector modes have been stored in the non-volatile memory of the electronic control system.

The method for calibrating a position detection sensor has been illustrated by way of example for the determination, by measuring, of the corresponding signal levels or voltage values for all the selector modes P, R, N, and D present. The method according to the invention can be, however, also applied to any combination of at least two of the selector modes P, R, N, and D present. Preferably, the two limit positions P and D are used here. The signal level bands for the selector modes that are not determined by a measuring device can then be calculated based upon the linear configuration of the switching points. It is also possible to sense the corresponding signal levels or voltage levels of only one of the selector modes by a measuring device and to determine therefrom the deviation from standard values of the respective selector mode. Such a deviation is then transferred to the other selector modes and the standard values of the selector modes are correspondingly corrected. The standard values are fixed, for example, based upon manufacturer's data and values obtained from experience, and stored in the non-volatile memory of the electronic control system.

To make the calibration procedure as convenient as possible for the operator, it is advantageous to connect the electronic control system to a service device through a diagnostic interface during the calibration procedure. As such, the operator can be informed of the status at that given moment of the calibration procedure through an output unit on the service device, and the calibration procedure can be carried out under computer control. In the process, the operator can be informed, for example, in the form of a type of operator instruction, when a signal level for the switched position selected at that given moment has been successfully stored and a new switched position is to be selected. The successful termination of the calibration procedure can also be signalled as acknowledged.

If the electronic control system 4 does not have such a diagnostic interface or if such a service device is not available, the operator is to ensure that the selector lever remains in a switched position at least for as long, i.e., 1 s, as is necessary to ensure that the signal level of the output signal of the position detection sensor 5 is constant for the predefined time period, and the respective signal level is, thus, stored in the volatile memory of the electronic control system 4.

The invention has been explained by way of example for a transmission controller that is integrated directly into the automatic transmission. However, the invention can also be applied to what are referred to as stand-alone units.

The calibration of an analog position detection sensor during the fabrication of a vehicle or after a replacement part is installed provides the great advantage that installation tolerances in the transmission and vehicle are largely eliminated with little effort. By using an analog position detection sensor in conjunction with the calibration method according to the invention, it is possible, in contrast to digital position detection sensors, to sense the selector modes of an automatic transmission in a very precise way and largely independently of tolerances of the overall system.

We claim:

1. A method for calibrating a position detection sensor in an electronic controller for a motor vehicle automatic transmission, which comprises:

selecting one of a plurality of selector modes of a selector slide;

determining which one of the selector modes the selector slide is in;

supplying an analog output signal from the position detection sensor as a function of a position of the selector slide;

determining a signal level of the analog output signal and storing the signal level in a non-volatile memory of an electronic control system;

repeating the above steps until at least two signal levels are stored for at least two of the selector modes;

determining signal level bands for respective ones of the at least two selector modes based upon the stored signal levels and storing the signal level bands in the non-volatile memory;

calculating signal level bands for other ones of the selector modes based upon the stored signal levels and also storing the calculated signal level bands in the non-volatile memory; and resetting a status identifier in the electronic control system if signal level bands are stored in the non-volatile memory for all of the selector modes.

2. The method according to claim 1, which further comprises representing, in the electronic control system, a calibration status of the position detection sensor with a status identifier.

3. A method for calibrating a position detection sensor in an electronic controller for a motor vehicle automatic transmission, which comprises:

providing a selector slide having a plurality of selector modes and positions;

supplying an analog output signal from the position detection sensor as a function of a position of the selector slide;

determining at least two signal levels of the analog output signal for at least two of the selector modes and storing the signal levels in a non-volatile memory of an electronic control system;

determining signal level bands for respective ones of the at least two selector modes based upon the stored signal levels and storing the signal level bands in the non-volatile memory; and calculating signal level bands for other ones of the selector modes based upon the stored signal levels and also storing the calculated signal level bands in the non-volatile memory.

4. The method according to claim 3, which further comprises resetting a status identifier in the electronic control system if signal level bands are stored in the non-volatile memory for all of the selector modes.

* * * * *